US012787907B2

(12) United States Patent
Fuchs et al.

(10) Patent No.: US 12,787,907 B2
(45) Date of Patent: Nov. 10, 2026

(54) AGRICULTURAL MACHINE ASSEMBLY WITH A DRIVER ASSISTANCE SYSTEM

(71) Applicant: Usines CLAAS France S.A.S, St. Rémy/Woippy (FR)

(72) Inventors: Volker Fuchs, Saarburg (DE); Grégory Batancourt, Vionville (FR); Philipp Bistritz, Singen (DE); Thierry Bonhomme, Macheren (FR); Pierre Dommange, Scy-Chazelles (FR); Josef Fischer, Biberach (DE); Hendrik Henselmeyer, Bad Rothenfelde (DE); Steve Obellianne, Courcelles-Chaussy (FR); Nicolas Risse, Retonfey (FR); Laurent Rongvaux, Tronville (FR); Jan Carsten Wieckhorst, Uelzen Ortsteil Hanstedt (DE)

(73) Assignee: Usines CLAAS France S.A.S, St. Rémy/Woippy (FR)

( * ) Notice: Subject to any disclaimer, the term of this patent is extended or adjusted under 35 U.S.C. 154(b) by 154 days.

(21) Appl. No.: 18/805,845

(22) Filed: Aug. 15, 2024

(65) Prior Publication Data

US 2025/0057068 A1 Feb. 20, 2025

(30) Foreign Application Priority Data

Aug. 15, 2023 (DE) ........................ 102023121767.4

(51) Int. Cl.
*A01B 76/00* (2006.01)
*A01B 69/00* (2006.01)
(Continued)

(52) U.S. Cl.
CPC ............ *A01B 76/00* (2013.01); *A01B 69/004* (2013.01); *A01B 69/008* (2013.01); *A01F 15/08* (2013.01)

(58) Field of Classification Search
CPC ..... A01B 76/00; A01B 69/004; A01B 69/008; A01B 71/00; A01F 15/08; A01F 15/00
See application file for complete search history.

(56) References Cited

U.S. PATENT DOCUMENTS 6,144,910 A 11/2000 Scarlett et al.
11,850,894 B2 * 12/2023 Ehlert .................. B60C 23/002
(Continued)

FOREIGN PATENT DOCUMENTS

DE 102021134406 A1 6/2023
EP 0838141 A2 4/1998
(Continued)

OTHER PUBLICATIONS

European Search Report for EP Application No. 24183357.3-1105 mailed Dec. 16, 2024.

*Primary Examiner* — Mussa A Shaawat
(74) *Attorney, Agent, or Firm* — Lempia Summerfield Katz LLC

(57) ABSTRACT

An agricultural machine assembly with a driver assistance system. The agricultural machine assembly includes the driver assistance system, and an agricultural work machine and an attachment adapted to the agricultural work machine and designed as an agricultural baler. The agricultural work machine and the attachment each comprise working units which may be actuated for setting parameters (P). The driver assistance system optimizes operation and is configured to form a work machine setting device and a baler setting device. The work machine setting device and the baler setting device are configured to optimize the mode of operation of the agricultural work machine and the agricultural baler depending on each other.

20 Claims, 3 Drawing Sheets

(51) Int. Cl.

| | |
|---|---|
| ***A01B 69/04*** | (2006.01) |
| ***A01F 15/08*** | (2006.01) |

(56) References Cited

U.S. PATENT DOCUMENTS

| | | | | |
|---|---|---|---|---|
| 12,035,650 | B2 * | 7/2024 | Zink | A01B 67/00 |
| 2017/0118918 | A1 * | 5/2017 | Chaney | A01F 15/0883 |
| 2017/0188505 | A1 * | 7/2017 | Potier | A01B 69/004 |
| 2018/0329619 | A1 * | 11/2018 | Wieckhorst | A01B 69/007 |
| 2019/0029184 | A1 * | 1/2019 | Kraus | A01F 15/0715 |
| 2019/0183031 | A1 | 6/2019 | Berger et al. | |
| 2021/0163005 | A1 * | 6/2021 | Ehlert | B60W 10/10 |
| 2021/0237520 | A1 * | 8/2021 | Ehlert | B60C 23/002 |
| 2022/0279710 | A1 * | 9/2022 | Wieckhorst | A01B 71/02 |
| 2022/0287215 | A1 * | 9/2022 | Jones | A01B 59/004 |
| 2023/0281053 | A1 * | 9/2023 | Kundu | G06F 9/5044<br>718/105 |
| 2023/0406401 | A1 * | 12/2023 | Battlogg | B60K 35/10 |
| 2024/0049633 | A1 * | 2/2024 | Vandike | A01D 41/127 |
| 2024/0049636 | A1 * | 2/2024 | Vandike | A01D 41/1217 |
| 2024/0188474 | A1 * | 6/2024 | McClelland | A01M 7/0089 |

FOREIGN PATENT DOCUMENTS

| | | | |
|---|---|---|---|
| EP | 0838141 | B1 | 12/2003 |
| EP | 3243367 | B1 | 11/2019 |
| EP | 3498066 | B1 | 7/2021 |

* cited by examiner

AGRICULTURAL MACHINE ASSEMBLY WITH A DRIVER ASSISTANCE SYSTEM

CROSS REFERENCE TO RELATED APPLICATION

This application claims priority under 35 U.S.C. § 119 to German Patent Application No. DE 10 2023 121 767.4 filed Aug. 15, 2023, the entire disclosure of which is hereby incorporated by reference herein.

TECHNICAL FIELD

The present invention relates to an agricultural work machine assembly.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Adjustment of an agricultural work machine assembly, which may consist of an agricultural work machine and an attachment, is a complex process that requires an operator to have considerable knowledge of both the agricultural work machine and the adapted attachment. In addition, the operator must have agronomic knowledge in order to be able to assess the effects of settings.

In this context, EP 0 838 141 A1 discloses a system in which an attachment designed as a plow is equipped with a computer that is coupled to an operating and display unit of an agricultural work machine designed as a tractor. The operator may specify setting parameters for the plow using the operating and display unit.

BRIEF DESCRIPTION OF THE DRAWINGS

The present application is further described in the detailed description which follows, in reference to the noted drawings by way of non-limiting examples of exemplary embodiment, in which like reference numerals represent similar parts throughout the several views of the drawings, and wherein.

DETAILED DESCRIPTION

Figure 1:
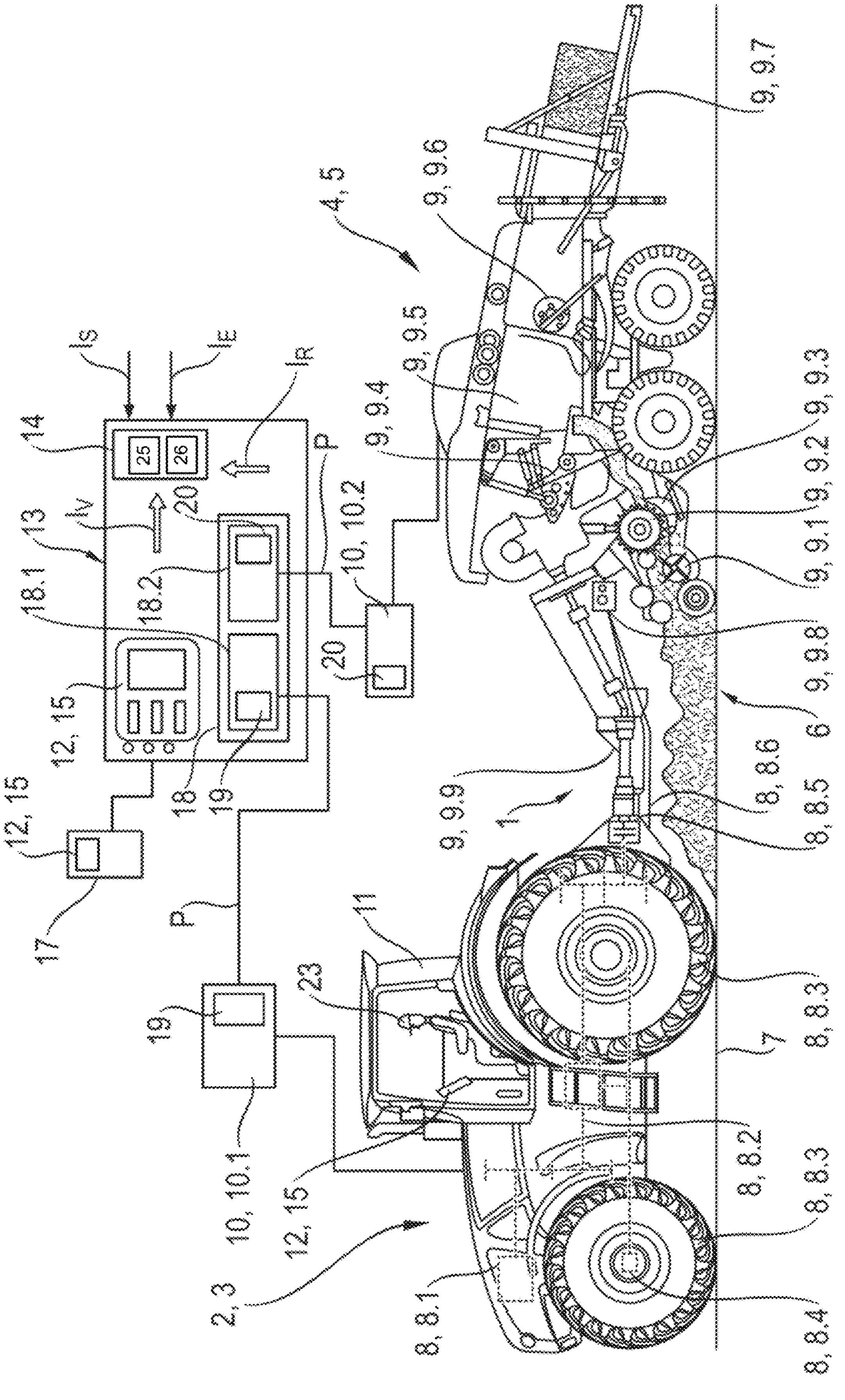
FIG. 1 illustrates a schematic representation of an agricultural machine assembly which comprises an agricultural work machine that is designed in the form of a tractor, and an agricultural baler adapted thereto which is designed in the form of a square baler, and a driver assistance system.

As discussed in the background, it may be a challenge for the operator to have the requisite knowledge to control both the agricultural work machine and the adapted attachment. In addition to the necessary knowledge, there may also be the challenge that the setting parameters of the agricultural work machine and agricultural attachment may mutually influence each other. Incorrect settings may negatively impact the work result, whether measured in terms of work quality, achievable area output and/or consumption of operating resources. For economical operation of such an agricultural work machine assembly, it may therefore be relevant that the machine assembly is operated in the most coordinated and efficient way possible. The number of different work machines, such as tractors, and attachments within a particular category may make it difficult for the operator to adjust the setting parameters of the devices belonging to the machine assembly in such a manner, and to adapt them to the particular operating situation influenced by the environmental and harvesting or working conditions to enable optimum operation of the machine assembly with a desired work result.

With some agricultural machine assemblies, there may be a particularly high level of complexity in specifying setting parameters. One such agricultural machine assembly, for example, is one that comprises an agricultural work machine and an agricultural baler adapted thereto as an attachment. The complexity in this case results from the large number of working units of the agricultural baler required to form a bale and may also be controlled at the same time. Even for a particularly experienced operator with extensive specialized knowledge, there are regularly major challenges in specifying optimum setting parameters for operation.

Thus, an agricultural machine assembly is disclosed that is configured to generate a simplified and improved specification or adjustability of setting parameters, which may better take into account the complex relationships for achieving improved (or optimized) operation of the agricultural machine assembly with regard to an upcoming work order to be performed.

In one or some embodiments, an agricultural machine assembly comprises an agricultural work machine and an attachment adapted to the agricultural work machine. Alternatively, the agricultural machine assembly comprises the agricultural work machine that is configured to be attached to the attachment (e.g., the agricultural baler). The agricultural work machine and the attachment may each comprise working units, which may be controlled for setting one or more setting parameters. The agricultural machine assembly may further comprise a driver assistance system that automatically controls (such as optimizes) operation, which may comprise a computing unit and at least one operating and display unit (e.g., a touchscreen). The computing unit may be configured to automatically process any one, any combination, or all of: information generated by machine-internal sensor systems; external information; information storable in the computing unit; or information specifiable by the control and display unit. The agricultural machine assembly may comprise at least one control apparatus configured to automatically control and automatically regulate the agricultural work machine and the attachment (e.g., send commands to set the one or more setting parameters in the working units for one or both of the agricultural work machine or the agricultural attachment). In one or some embodiments, the attachment of the agricultural machine assembly may comprise an agricultural baler. Further, the driver assistance system may form an automated (or automatic) work machine setting device and a baler setting device. The automated work machine setting device and the baler setting device, respectively, bring about an automatic optimization of the mode of operation of the agricultural work machine and the agricultural baler as a function of one another, wherein any one, any combination, or all of the information generated by machine-internal sensor systems, the external information, the information storable in the computing unit and the information specifiable using the operating and display unit may form input signals of the respective setting devices, and setting parameters of the agricultural work machine and setting parameters of the agricultural baler may be output signals of the respective setting devices (e.g., the automated work machine setting device may automatically output the one or more setting parameters for the agricultural work machine and the baler setting device may automatically output the one or more setting parameters for the agricultural baler). The respective setting device (whether one or both of the automated work machine setting device and the baler setting device) is configured to transmit the setting parameters to the at least one control apparatus, wherein the at least one control apparatus is configured to automatically control the working units of the agricultural work machine and the agricultural baler, respectively, to set the setting parameters (e.g., the at least one control apparatus may automatically send commands to set the one or more setting parameters in the working units for one or both of the agricultural work machine or the agricultural attachment).

In one or some embodiments, the term "setting parameter" comprises one or more operating parameters, such as, for example, any one, any combination, or all of a drive rotational speed, a hydraulic or pneumatic pressure or the like, as well as machine parameters such as for example distance, number, and the like.

In one or some embodiments, the structured driver assistance system is configured to automatically cause harmonized optimization of setting parameters of the agricultural work machine and the agricultural baler adapted thereto, which may make the operation of the agricultural machine assembly more efficient overall. The driver assistance system may therefore produce an optimized adaptation of the setting parameters to a given operating situation in order to effectively and optimally configure the operation of the agricultural machine assembly. In particular, the extremely complex process of setting an agricultural machine assembly with an agricultural baler may be significantly simplified, whereby incorrect settings of the agricultural machine assembly by an operator may be avoided.

In one or some embodiments, the work machine setting device and the baler setting device form a common setting device. This may mean that the work machine setting device and the baler setting device may be automatically operated and automatically controlled centrally by the driver assistance system in order to optimize the operation of the agricultural machine assembly, which may have a complex structure comprising (or consisting of) the agricultural work machine and the agricultural baler adapted thereto, that may arise due to the large number of working units of the agricultural baler.

In one or some embodiments, the baler setting device is configured to form working-unit-specific part setting devices, wherein a particular part setting device is configured to output setting parameters of a particular working unit of the agricultural baler as an output signal. In this regard, the baler setting device may comprise a plurality of working-unit-specific part setting devices, with each tailored to output setting parameter(s) for the respective working units for the agricultural baler that correlate to the respective one of the plurality of working-unit-specific part setting devices.

By configuring the baler setting device to form working unit-specific part setting devices, the optimization of the mode of operation of the machine assembly may be influenced very specifically, namely depending on the specific working unit of the agricultural baler, taking into account a baling process to be performed in a field.

In one or some embodiments, the driver assistance system comprises a common set of rules or a set of rules assigned to the work machine setting device and the baler setting device particularly, which set(s) of rules bring about an optimization of the mode of operation of the agricultural machine assembly.

In one or some embodiments, the at least one control apparatus is designed as an ISO-based control apparatus, wherein the control apparatus may form part of the work machine setting device and the baler setting device.

By standardizing the communication between the work machine and the agricultural baler using the so-called ISO bus, their operation (e.g., setting and control) may be simplified. Especially when working with agricultural balers from different manufacturers, the ISO-based control apparatus may be advantageous since communication or data exchange between the agricultural work machine and the agricultural baler via the ISO bus is uncomplicated and may only require a coupling of agricultural work machine and the agricultural baler.

In one or some embodiments, the setting parameters of the agricultural working machine and the setting parameters of the agricultural baler comprise any one, any combination, or all of: a driving speed adjustable via a drive unit and/or drive train of the agricultural work machine; a steering angle adjustable via a steering system of the agricultural work machine; an orientation of the agricultural baler relative to the agricultural work machine; a rotational speed of a power take-off shaft of the agricultural work machine; a hydraulic pressure to be provided by means of a hydraulic system of the agricultural working machine; a tire pressure of at least one ground engaging means of the agricultural work machine; a torque and/or a rotational speed of a pick-up of the agricultural baler; a torque and/or a rotational speed of a rotor of the agricultural baler; an activation or deactivation of blades of the agricultural baler; a rotational speed and/or number of strokes of a shredder of the agricultural baler; a pressure to be applied in a baling chamber of the agricultural baler; an activation or deactivation of a tying device of the agricultural baler; or a deposit of a bale formed by means of the agricultural baler.

Due to the large number of setting parameters that may be influenced or determined using the setting devices, the mode of operation of the agricultural machine assembly may be automatically and comprehensively optimized.

In one or some embodiments, the driver assistance system comprises selectable strategies for optimizing the mode of operation of the agricultural machine assembly.

Even before the actual optimization begins, this may allow for the specification of the prioritized target setting with which the operator may want to operate the agricultural machine assembly. The selectable strategies may be work machine-specific strategies, baler-specific strategies, and/or a combination of both. The optimization of the mode of operation of the agricultural machine assembly may be based on technical and agronomic knowledge combined with each other. The technical and agronomic knowledge may be saved as a set of rules.

In one or some embodiments, the selectable strategies may comprise any one, any combination, or all of: "bale density"; "bale quality"; "energy consumption"; "throughput"; "binding material"; "service life"; or "user-defined".

The strategies may allow the operator to call up, select or specify specific target values for their overarching objectives, which the operator may want to achieve or maintain when performing the baling process. For the "bale density" optimization strategy, for example, the target value "weight of harvested material/volume of bales", for the "bale quality" optimization strategy, for example the target values "weight of harvested material/volume of bales" and "moisture of harvested material per bale", for the "energy consumption" optimization strategy, for example the target value "amount of fuel/unit of time", for the "throughput" optimization strategy, for example the target value "weight or volume of harvested material/unit of time", for the "binding material" optimization strategy, for example the target value "thickness and/or strength of the binding material", and/or for the "service life" optimization strategy, for example the target value "number of operating hours" may be defined or specified.

In one or some embodiments, the driver assistance system is configured to automatically determine the one or more setting parameters of the agricultural work machine and the one or more setting parameters of the agricultural baler for optimizing the mode of operation of the agricultural machine assembly based on dialog, wherein the automatic determination of at least some of the setting parameters by the driver assistance system may occur before starting up the agricultural machine assembly and/or the assumption of a baling process by the agricultural machine assembly.

This may make it possible to take into account that some of the settings to be made may be made independent of the prevailing conditions on the field to be worked. The dialog-based determination of setting parameters may be done in natural language (e.g., by a dialog specified and performed by the driver assistance system). The dialog may be configured in a hierarchical fashion and may follow the top-down approach.

In one or some embodiments, the driver assistance system comprises a settings module which is used for any one, any combination, or all of dialog-based retrieval, dialog-based input or dialog-based specification of operating parameters and/or machine parameters of the agricultural work machine and the agricultural baler.

Using the settings module, basic settings of the agricultural machine assembly may be made before the startup of the agricultural machine assembly and/or the assumption of a baling process, the execution of which may be fundamental for the baling process then to be performed. A less-experienced operator may therefore not be overwhelmed by the wealth of operating and/or machine parameters, which may be enormous, in particular in an agricultural machine assembly comprising (or consisting of) an agricultural work machine and an agricultural baler. Instead, the operator may be guided through the settings in a structured manner and only confronted with the essential parameters.

In one or some embodiments, device-specific setting parameters for at least one combination comprising (or consisting of) an agricultural work machine and an agricultural baler may be saved in the computing unit so that they may be recalled.

In one or some embodiments, the retrievable storage of setting parameters may provide a non-editable basic configuration of the agricultural machine assembly, which may be used to optimize the mode of operation of the setting devices. In one or some embodiments, the device-specific setting parameters for the at least one combination may be saved as a personalized data set and thus be editable.

In one or some embodiments, a functional model of the agricultural work machine and the agricultural baler is saved in the computing unit and may represent at least some of the functional relationships of the agricultural work machine and the agricultural baler adapted thereto.

Accordingly, the various operating situations of the agricultural work machine and the agricultural baler may be modeled via the functional model in order to achieve an automatic optimization of the mode of operation of the agricultural work machine and the agricultural baler in the particular operating system and taking into account the selected control strategy.

The functional model may be designed in different ways. It is contemplated, for example, that the functional model is based on classical algorithms that map the functional relationships of the agricultural work machine and the agricultural baler adapted thereto. Equally, however, it is also contemplated that the functional model is a black box model which may be based, for example, on artificial intelligence, such as an artificial neural network, in order to map the functional relationships of the agricultural work machine and the agricultural baler adapted thereto.

In order to map the functional relationships of the agricultural work machine and the agricultural baler adapted thereto, the functional model may comprise at least one n-dimensional characteristic map which may be assigned to at least one setting parameter of the agricultural work machine and/or the agricultural baler, wherein the particular setting parameter defined as an output variable of the at least one n-dimensional characteristic map (e.g., so that the functional model maps the one or more functional relationships of the agricultural work machine and the agricultural baler adapted thereto).

In one or some embodiments, the information generated by any one, any combination, or all of the machine-internal sensor systems, the external information, the information that may be saved in the computing unit and the information that may be provided by the operating and display unit may form the input variables to the at least one n-dimensional characteristic map.

In one or some embodiments, the computing unit may automatically compare the at least one n-dimensional characteristic map with the operating conditions of the agricultural machine assembly during ongoing operation, such as cyclically. Responsive to the computing unit automatically determining that there is a change in the operating conditions, the n-dimensional characteristic map may be automatically adapted or another n-dimensional characteristic map may be automatically used to determine the particular setting parameter.

The at least one n-dimensional initial map for the particular setting parameter may be saved in the computing unit, which the computing unit may use as the basis for the first automatic determination of the at least one setting parameter. In this regard, for example, the data set(s) may be automatically accessed that were saved in the computing unit at an earlier point in time of use of the agricultural machine assembly.

Using the at least one n-dimensional characteristic diagram, even complex functional relationships of a system from the machine assembly and environment may be depicted with a slight amount of computing effort. Characteristic curves of the n-dimensional characteristic diagram may be adapted to the particular situation in order to holistically take into account relationships during the operation of the agricultural machine assembly and environmental conditions that have an influence on the control strategies. The characteristic curves of the n-dimensional characteristic map may be adapted by the particular setting devices (e.g. the work machine setting device and the baler setting device).

In one or some embodiments, the driver assistance system is configured to visualize, by means of the at least one operating and display unit, an operating process for adjusting a setting parameter to be adapted for optimizing the mode of operation of the agricultural machine assembly.

For this purpose, in addition to the particular value determined or suggested by the driver assistance system for a setting parameter, the operator may also be shown the working unit or units of the agricultural work machine and/or the agricultural baler on which the corresponding setting is to be made by actuation (e.g., automatic control actuation) via the at least one control apparatus. In one or some embodiments, part of the setting of setting parameters may be performed automatically or remotely, while another part of the setting of setting parameters to be performed may require manual intervention. The display of the working unit or units that are to be set by manual intervention may be in the form of individual pictograms or icons or as a sequential image sequence. In this regard, the driver assistance system may generate a visualization for the operator. Alternatively, the driver assistance system may perform the control (using the at least one control apparatus) entirely automatically (with no or minimal input from the operator, such as selection of the respective selectable strategy).

In one or some embodiments, the at least one operating and display unit of the driver assistance system is part of a mobile data processing device and may comprise a touchscreen or the like. The advantage of designing at least one operating and display unit of the driver assistance system as a component of a mobile data processing device is that the operator may carry it with him/her when the previously determined setting parameter(s) are set, such as manually, for the agricultural machine assembly. The mobile data processing device may communicate wirelessly and/or wired with the driver assistance or system. Alternatively, the at least one operating and display unit may be executed on remote control hardware, such as remote from the agricultural work machine and/or the agricultural baler. In one or some embodiments, remote control hardware, which may comprise data processing hardware remote from the machine assembly, may for example be a cloud-based data processing system. In principle, the data source remote from the machine assembly may also be a data server remote from the agricultural machine assembly that communicates via an Internet connection or the like with the agricultural machine assembly.

Referring to the figures, FIG. 1 shows an agricultural machine assembly 1 which comprises (or consists of) an agricultural work machine 2 (e.g., a tractor 3), and an attachment 4 adapted thereto, which may be designed as an agricultural baler 5. The agricultural baler 5 is shown in the figures in the form of a square baler, although a round baler may equally be adapted to the agricultural work machine 2, in this case the tractor 3. In FIG. 1, the agricultural machine assembly 1 is shown while it is performing a baling process 6 on a field 7.

Both the agricultural work machine 2 as well as the agricultural baler 5 of the agricultural machine assembly 1 adapted thereto may each comprise working units 8, 9 which may be actuated to set setting parameters P, which may be essential for performing the baling process 6.

Working units 8 of the agricultural work machine 2 are, for example, any one, any combination, or all of: a drive unit 8.1 which may be designed as an internal combustion engine; a hybrid drive unit or an electric motor drive unit; a drive train 8.2 with various gearbox assemblies, couplings and shafts; ground engaging means 8.3 shown here in the form of tires which may, however, also be designed as crawler tracks; a steering system 8.4 for steering the agricultural machine assembly 1; a power take-off shaft 8.5 for transmitting drive power to the agricultural baler 5; or a hydraulic system 8.6.

Working units 9 of the agricultural baler 5 are, for example, any one, any combination, or all of: a pick-up 9.1; a rotor 9.2; blades 9.3; a feed rake 9.4; a pressing chamber 9.5 with a pressing means; a binding device 9.6; a tailgate (not shown in the figures); a bale deposit device 9.7; a hydraulic system 9.8; or a drawbar 9.9.

The setting parameters P that may be set by actuating the working units 8, 9 of the agricultural machine assembly 1 may be any one, any combination, or all of: a driving speed of the agricultural machine assembly 1 (which may be specified, for example, by means of the drive unit 8.1 and/or the drive train 8.2 of the agricultural work machine 2); a steering angle of the agricultural work machine 2 (which may be set, for example, using the steering system 8.4 of the agricultural work machine 2); an orientation of the agricultural baler 5 relative to the agricultural work machine 2 (which may be set, for example, via the drawbar 9.9); a rotational speed of the PTO shaft 8.5 of the agricultural work machine 2; a hydraulic pressure to be provided by the agricultural work machine 2 by means of the hydraulic system 8.6; a tire pressure of at least one ground engaging means 8.3 of the agricultural work machine 2; a torque and/or a rotational speed of the pick-up 9.1 of the agricultural baler 5; a torque and/or a rotational speed of the rotor 9.2 of the agricultural baler 5; a time for activating or deactivating the blades 9.3 of the agricultural baler 5; a rotational speed and/or number of strokes of the feed rake 9.4 of the agricultural baler 5; a pressure applied in the pressing chamber 9.5 of the agricultural baler 5; a time for activating or deactivating the binding device 9.6 of the agricultural baler 5; or a time for depositing a bale. Further working units 8, 9 of the agricultural machine assembly 1 and setting parameters P of the agricultural machine assembly 1, which may be relevant for performing the baling process 6, are not excluded by the above-mentioned citation of specific, preferred working units 8, 9 and setting parameters P.

In one or some embodiments, the work units 8 of the agricultural work machine 2 are controlled and regulated by a control apparatus 10.1, which may be designed as a job computer. The control apparatus 10.1 may be configured to set setting parameters P of these working units 8 by actuating the working units 8 (e.g., by automatically sending commands to the working units 8; responsive to receipt of the commands, the working units 8 may automatically configure and perform). An operating and display unit 12, which may be in connection with the control apparatus 10.1, may be arranged or positioned in a cab 11 of the agricultural work machine 2. The agricultural baler 5 may equally be assigned a control apparatus 10.2, which may be used to control and regulate one or more working units 9 of the agricultural baler 5. The control apparatus 10.2 may also be designed as a job computer. The control apparatus 10.2 is configured to set setting parameters P of these working units 9 by actuating the working units 9. The control apparatuses 10.1 and 10.2 of the agricultural machine assembly 1 may, as shown, be designed separately or as a common control apparatus 10, which may be arranged or positioned on the agricultural work machine 2 or the agricultural baler 5.

The agricultural machine assembly 1 may also be assigned a driver assistance system 13, which may be used to set up and/or optimize the operation of the agricultural machine assembly 1 comprising (or consisting of) the agricultural work machine 2 and agricultural baler 5. Examples of a driver assistance system are disclosed in US Patent Application Publication No. 2019/0183031 A1, which is incorporated by reference herein in its entirety.

The driver assistance system 13 has a computing unit 14 and at least one operating and display unit 15. The computing unit 14 processes internal information $I_S$ generated by the machine-internal sensor systems 16, external information $I_E$, information $I_R$ that may be saved in the computing unit 14 and in-formation $I_V$ that may be provided by the control and display unit 12, 15. The operating and display unit 12 may be formed by the operating and display unit 15 in the cab 11 of the agricultural work machine 2 or designed as an additional operating and display unit, in particular as part of a mobile data processing device 17 such as a cell phone or tablet.

Computing apparatuses, such as any one, any combination, or all of computing unit 14, control apparatus 10.1 or control apparatus 10.2, may include at least one processor 25 and at least one memory 26 (FIG. 1 illustrates computing unit 14 with the processor 25 and the memory 26). The at least one processor 25 and at least one memory 26 may be in communication with one another. In one or some embodiments, the processor 25 may comprise a microprocessor, controller, PLA, or the like. Similarly, the memory 26 may comprise any type of storage device (e.g., any type of memory). Though the processor 25 and the memory 26 are depicted as separate elements, they may be part of a single machine, which includes a microprocessor (or other type of controller) and a memory. Alternatively, the processor 25 may rely on the memory 26 for all of its memory needs. The memory 26 may comprise a tangible computer-readable medium that include software that, when executed by the processor 25 is configured to perform any one, any combination, or all of the functionality described herein regarding any computing device.

The processor 25 and the memory 26 are merely one example of a computational configuration. Other types of computational configurations are contemplated. For example, all or parts of the implementations may be circuitry that includes a type of controller, including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

In one or some embodiments, the driver assistance system 13 is structured so that it forms a work machine setting device 18.1 and a baler setting device 18.2, wherein the particular setting devices 18.1, 18.2 may generate an optimization of the mode of operation of the agricultural work machine 2 and the at least one agricultural baler 5 depending on each other. In one or some embodiments, the driver assistance system 13 may comprise one or more sets of rules, such as sets of rules 19, 20 assigned to the work machine setting device 18.1 and the baler setting device 18.2 for optimizing the mode of operation of the agricultural work machine 2 and the agricultural baler 5. In one or some embodiments, the work machine setting device 18.1 and the baler setting device 18.2 form a common setting device 18 (e.g., housed within a single computer with separate computer threads that perform the functions for the work machine setting device 18.1 and the baler setting device 18.2). Alternatively, separate devices may be used for the work machine setting device 18.1 and the baler setting device 18.2.

Figure 2:
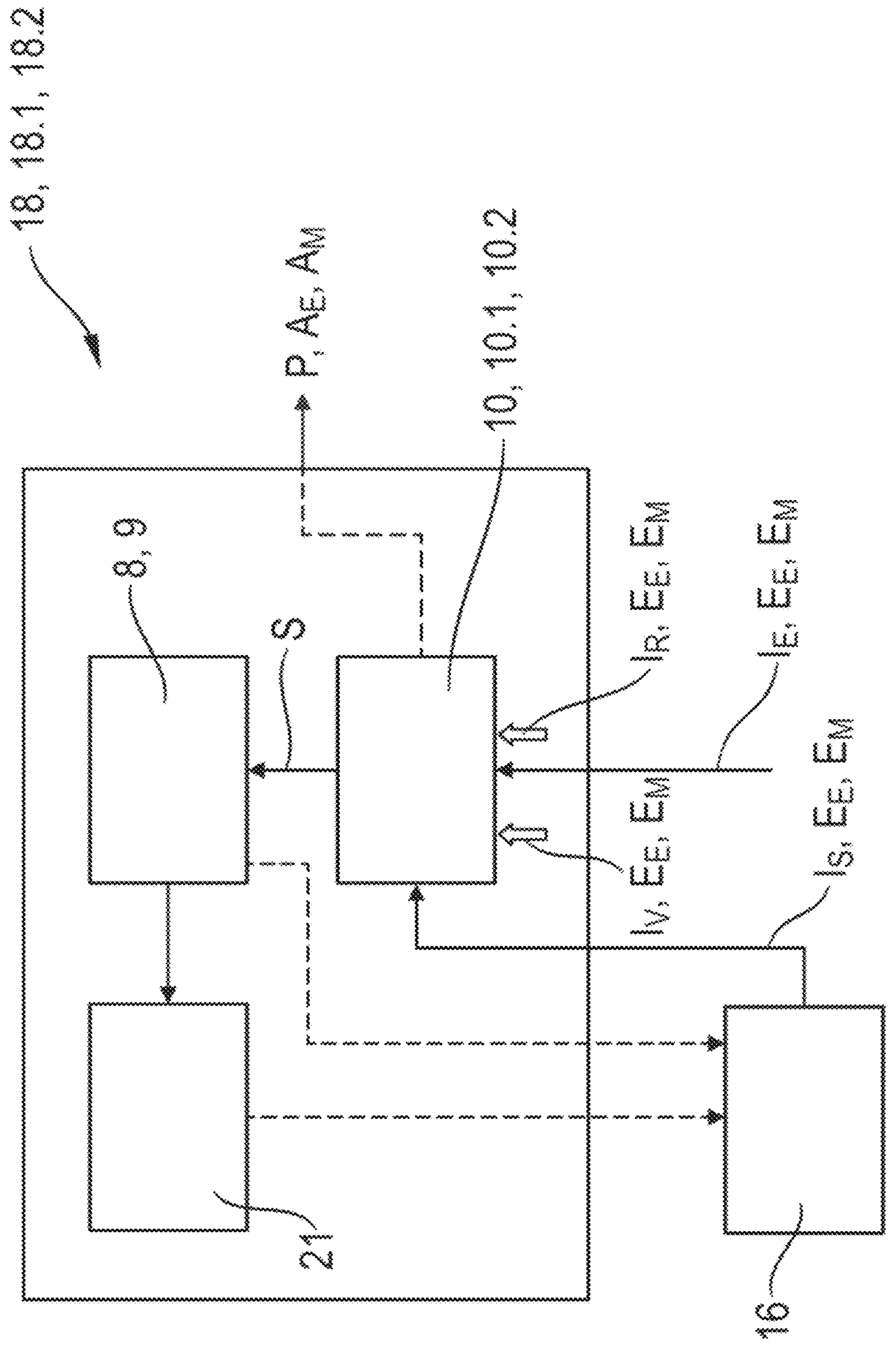
FIG. 2 illustrates a schematic representation of a setting device of the driver assistance system of the agricultural machine assembly according to FIG. 1.

In FIG. 2, the structure of the setting devices 18, 18.1, 18.2 is shown schematically. The setting devices 18, 18.1, 18.2 comprise the working units 8, 9 of the agricultural work machine 2 and the agricultural baler 5, machine-internal sensor systems 16 and the control apparatuses 10, 10.1, 10.2. Control signals S are transmitted from the control apparatus 10, 10.1, 10.2 to the working units 8, 9 by data transmission, such as using a bus system, which may be used for one or more working units 8, 9. At least one sensor system 16 is configured to generate sensor data indicative of monitoring at least one of the working units 8, 9 and/or one or more actuators 21 assigned to the work units 8, 9. The sensor data generated by the at least one sensor system 16 may be transmitted wired and/or wirelessly using the bus system to the control apparatus 10, 10.1, 10.2 in order for the control apparatus 10, 10.1, 10.2 to evaluate and may represent (or from which to derive) the internal information $I_S$. Alternatively, or in addition, the control apparatus 10, 10.1, 10.2 may receive any one, any combination, or all of external information $I_E$, the information $I_R$ that may be saved in the computing unit 14 and the information $I_V$ that may be specified via the operating and display unit 12, 15.

The sensor data provided by the at least one sensor system 16 (e.g., internal information $I_S$), the information $I_R$ that may be saved in the computing unit 14, the external information $I_E$ and the information $I_V$ that may be preset using the operating and display unit 12, 15 may form input signals $E_E$ of the particular setting device 18, 18.1, 18.2. Output signals of the particular setting device 18, 18.1, 18.2 are designated by $A_E$, wherein the output signals $A_E$ may represent the setting parameters P. The setting device(s) 18, 18.1, 18.2 may be configured to control, such as optimize, the operation of the agricultural work machine 2 and the agricultural baler 5 autonomously (e.g., the setting device(s) 18, 18.1, 18.2 are configured to continuously automatically determine and automatically specify the required settings of setting parameters P of the working units 8, 9). Thus, the setting devices 18, 18.1, 18.2 may automatically set parameters P adapted to the particular working conditions (e.g., by automatically determining and automatically commanding the set parameters P for the various working units 8, 9. In one or some embodiments, the work machine setting device 18.1 and the baler setting device 18.2 may be designed as structurally identical, as described above, and work in the same way. The particular setting devices 18.1, 18.2 or the setting devices 18.1, 18.2 combined in the common setting device 18 may optimize the mode of operation of the agricultural work machine 2 and the agricultural baler 5 depending on one another. In this way, the above setting devices 18, 18.1, 18.2 may be provided, which automatically control, in a coordinated manner, some or all variables relevant for the baling process 6 and for the agricultural work machine 2 used for this purpose and the agricultural baler 5 adapted thereto. In particular, this may prevent competing and possibly mutually canceling controls from being performed from different sides (e.g., from a first control unit configured to control the agricultural work machine 2 and from a second control configured to control the agricultural baler 5). Instead, all relevant setting parameters P may be controlled "from a single source". In one or some embodiments, the baler setting device 18.2 may be designed as a working unit-specific part setting device. As discussed above, there may be a plurality of working units 9 within the agricultural baler 5. In such an instance, a particular part setting device may then be provided for one, some, or each of plurality of working units 9 within the agricultural baler 5 and configured to output the setting parameters P of a respective working unit 9 of the agricultural baler 5 as an output signal $A_E$. Similarly, there may be a plurality of working units 8 within the agricultural production machine 2. In such an instance, a particular part setting device may then be provided for one, some, or each of plurality of working units 8 within the agricultural production machine 2 and configured to output the setting parameters P of a respective working unit 8 of the agricultural production machine 2 as an output signal $A_E$.

Figure 3:
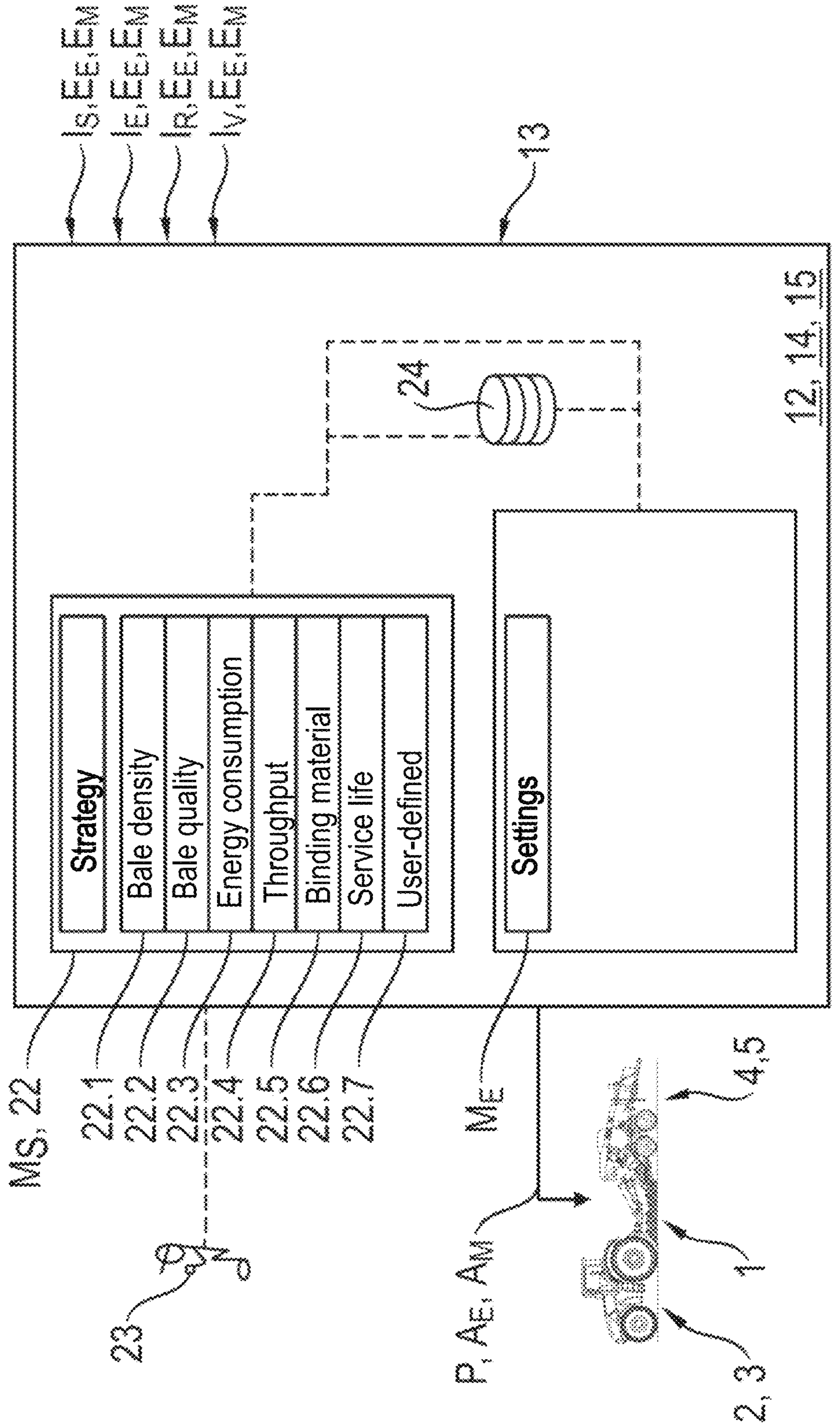
FIG. 3 illustrates a schematic representation of the driver assistance system of the agricultural machine assembly according to FIG. 1.

In one or some embodiments, the driver assistance system 13 comprises selectable strategies 22 as schematically shown in FIG. 3 for optimizing the mode of operation of the agricultural machine assembly 1. In particular, a plurality of selectable strategies 22 may be available from which to choose. Even before the actual optimization begins, this may allow the specification of the prioritized target setting with which an operator 23 wants to operate the agricultural machine assembly 1. Here, the selectable strategies 22 may be work machine-specific, baler-specific strategies 22 and/or a combination of both. In practice, the operating and display unit 12 may output one or more of the selectable strategies 22 from which the operator may choose (e.g., choose via a touchscreen).

The selectable strategies 22 comprise any one, any combination, or all of the following strategies: bale density strategy 22.1; bale quality strategy 22.2; energy consumption strategy 22.3; throughput strategy 22.4; binding material strategy 22.5; service life strategy 22.6; or user-defined strategy 22.7. For each strategy 22, a specific target value which is to be achieved or maintained when carrying out the baling process 6 may be saved, may be selected by the operator 23 via the operating and display unit 12, 15 and/or may be preset by the operator 23 using the operating and display unit 12, 15.

For the "bale density" optimization strategy 22.1, the target value "weight of harvested material/volume of bale" may be defined or specified. For the "bale quality" optimization strategy 22.2, the target values "weight of harvested material/volume of bales" and "moisture of harvested material per bale" may be defined or specified. For the "energy consumption" optimization strategy 22.3, the target value "amount of fuel/unit of time" may be defined or specified. For the "throughput" optimization strategy 22.3, the target value "weight or volume of harvested material/unit of time" may be defined or specified. For the "binding material" optimization strategy 22.5, the target value "thickness and/or strength of the binding material" may be defined or specified. For the "service life" optimization strategy 22.6, the target value "number of operating hours" may be defined or specified. The "user-defined" strategy 22.7 makes it possible to link the available strategies 22.1 to 22.6 at least partially with each other with variable proportions.

In addition to the selectable strategies 22, FIG. 3 further schematically portrays the driver assistance system 13 while simultaneously illustrating visualization, operating and structural aspects thereof. The driver assistance system 13 has a strategy module $M_S$, which may be used to select one of the aforementioned strategies 22, and a settings module $M_E$, which may be used to configure the agricultural machine assembly 1 by the operator 23. As part of the execution of the settings module $M_E$, data on various agricultural work machines 2 and agricultural balers 5 (e.g., operating parameters and/or machine parameters) may optionally be retrieved from the computing unit 14 (e.g., information $I_R$) and/or specified by the operator 23 using the operating and display unit 12, 15 (information $I_V$). The data may comprise manufacturer-specific operating and/or machine parameters of the agricultural work machine 2 and the agricultural baler 5 (e.g., some or all those parameters that do not necessarily have to be specifically edited by the operator 23). Alternatively, or in addition, there may be operator-specific operating parameters and/or machine parameters of the agricultural work machine 2 and the agricultural baler 5, which may be assigned by the operator 23. In one or some embodiments, device-specific operating parameters and/or device-specific machine parameters may be retrievably saved in the computing unit 14 for different agricultural work machines 2 and/or different agricultural balers 5. In this manner, a non-editable basic configuration may be provided that may be used for optimizing the mode of operation of the particular agricultural machine assembly 1 by the particular setting device 18, 18.1, 18.2.

By using the retrievable and/or specifiable operating parameters and/or machine parameters, the mode of operation of the specific agricultural machine assembly 1 may be automatically optimized in addition to the information $I_S$ generated by the machine-internal sensor systems 16 and external information $I_E$. Accordingly, in one or some embodiments, only the setting parameters P that are possible or relevant for the special agricultural machine assembly 1 for optimizing the mode of operation of the driver assistance system 13 are determined by the setting devices 18, 18.1, 18.2 and set by the control apparatuses 10, 10.1, 10.2 by actuating the working units 8, 9.

The setting parameters P may be determined using a functional model of the agricultural work machine 2 and the agricultural baler 5, which may depict the functional relationships between the agricultural work machine 2 and the agricultural baler 5. The functional model may be saved in the computing unit 14 of the driver assistance system 13, for example in a database 24 in which retrievable operating parameters and/or machine parameters may also be saved. In one or some embodiments, the functional model may comprise at least one n-dimensional characteristic map, which may be assigned to at least one setting parameter P of the agricultural work machine 2 and/or the agricultural baler 5 in order to map the functional relationships of the agricultural work machine 2 and the agricultural baler 5. Any one, any combination, or all of the information $I_S$ generated by the machine-internal sensor systems 16, the external information $I_E$, the information $I_R$ that may be saved in the computing unit 14 and the information $I_V$ that may be specified using the operating and display unit 12, 15 may form the input variables $E_M$; the particular setting parameter P may define the output variable $A_M$ of the at least one n-dimensional characteristic diagram.

Overall, the driver assistance system 13 may be configured to determine the setting parameters P of the agricultural work machine 2 and the agricultural baler 5 based on dialog which also includes the configuration via the strategies module $M_S$ and settings module $M_E$. However, the driver assistance system 13 may also be configured to automatically determine the setting parameters P of the agricultural work machine 2 and the agricultural baler 5. In both cases, communication (e.g., the dialog with the operator 23) may occur in natural language. The driver assistance system 13 may furthermore be configured to visualize, using the at least one operating and display unit 12, 15, an operating process for adjusting a setting parameter to be adapted for optimizing the mode of operation of the agricultural machine assembly 1. The menu guidance and operating concept of the driver assistance system 13 may be based on explaining setting recommendations in addition to natural language dialog by using icons, pictograms, illustrations with magnified views and/or colored highlights.

Further, it is intended that the foregoing detailed description be understood as an illustration of selected forms that the invention may take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting physical properties model may be downloaded or saved to computer storage.

LIST OF REFERENCE NUMBERS

1 Agricultural machine assembly
2 Agricultural production machine
3 Tractor
4 Attachment
5 Agricultural baler
6 Baling process
7 Field
8 Working unit for work machine/tractor
8.1 Drive unit for work machine/tractor
8.2 Drive train for work machine/tractor
8.3 Ground engaging means for work machine/tractor
8.4 Steering system for work machine/tractor
8.5 PTO shaft for work machine/tractor
8.6 Hydraulic system for work machine/tractor
9 Baler working unit
9.1 Baler pick-up
9.2 Baler rotor
9.3 Baler blade
9.4 Baler feed rake
9.5 Baler pressing chamber
9.6 Baler knotting device
9.7 Baler deposit device
9.8 Baler hydraulic system
9.9 Baler drawbar
10 Control apparatus
10.1 Control apparatus
10.2 Control apparatus
11 Cab
12 Operating and display unit
13 Driver assistance system
14 Computing unit
15 Operating and display unit
16 Sensor system
17 Mobile data processing device
18 Setting device
18.1 Work machine setting device
18.2 Baler setting device
19 Set of rules
20 Set of rules
21 Actuator
22 Strategy
22.1 "Bale density" strategies
22.2 "Bale quality" strategy
22.3 "Energy consumption" strategy
22.4 "Throughput" strategy
22.5 "Binding material" strategy
22.6 "Service life" strategy
22.7 "User-defined" strategy
23 Operator
24 Database
25 Processor
26 Memory
P Setting parameter
$I_S$ Sensor system information
$I_E$ External information
$I_R$ Savable information for the computing unit
$I_V$ Specifiable information for the control and display unit
$E_E$ Input signal of the setting device
$A_E$ Output signal of the setting device
S Control signal
$E_M$ Model/characteristic map input variable
$A_M$ Model/characteristic map output variable
$M_S$ Strategy module
$M_E$ Settings module

The invention claimed is:

1. An agricultural machine assembly comprising:

an agricultural work machine configured to attach to an agricultural baler, wherein the agricultural work machine and the at least one attachment each comprise one or more working units configured to set one or more setting parameters;

wherein the agricultural machine assembly comprises:

a driver assistance system configured to control operation and includes a computing unit and at least one operating and display unit configured to receive information, wherein the driver assistance system comprises an automatic work machine setting device and a baler setting device, wherein the automatic work machine setting device and the baler setting device are configured to:

determine a mode of operation of the agricultural work machine and the agricultural baler depending on one another;

receive as input: information generated by machine-internal sensor systems; external information; information from at least one computing unit, and the information received via the at least one operating and display unit;

generate the one or more setting parameters of the agricultural work machine and the one or more setting parameters of the agricultural baler, wherein the driver assistance system is configured to use a functional model of the agricultural work machine and the agricultural baler in generating the one or more setting parameters of the agricultural work machine and the one or more setting parameters of the agricultural baler, wherein the functional model represents one or more functional relationships of the agricultural work machine and the agricultural baler adapted thereto;

transmit, to at least one control apparatus, the one or more setting parameters of the agricultural work machine and the one or more setting parameters of the agricultural baler; and wherein the at least one control apparatus configured to:

control actuation of: the one or more working units of the agricultural work machine based on the one or more setting parameters of the agricultural work machine; and the one or more working units of the agricultural baler based on the one or more setting parameters of the agricultural baler.

2. The agricultural machine assembly of claim 1, wherein the agricultural machine assembly further comprises the agricultural baler; and wherein the automatic work machine setting device and the baler setting device are functionally separate devices and are configured to optimize the mode of operation of the agricultural work machine and the agricultural baler depending on one another.

3. The agricultural machine assembly of claim 2, wherein the automatic work machine setting device and the baler setting device are configured to use a common set of rules, or a set of rules for optimization of the mode of operation of the agricultural machine assembly.

4. The agricultural machine assembly of claim 1, wherein the automatic work machine setting device and the baler setting device are functionally separate devices;

wherein the baler setting device is configured to form a plurality of working-unit-specific part setting devices; and wherein each of the plurality of working-unit-specific part setting devices are configured to output optimal setting parameters of a respective working unit of the agricultural baler as an output signal.

5. The agricultural machine assembly of claim 1, wherein the one or more setting parameters of the agricultural work machine and the one or more setting parameters of the agricultural baler comprise one or more of:

a driving speed settable using one or both of a drive unit or a drive train of the agricultural work machine;

a steering angle adjustable using a steering system of the agricultural work machine;

an orientation of the agricultural baler relative to the agricultural work machine;

a rotational speed of a power take-off shaft of the agricultural work machine;

a hydraulic pressure to be provided using a hydraulic system of the agricultural work machine;

a tire pressure of at least one ground engaging means of the agricultural work machine;

one or both of a torque or a rotational speed of a pick-up of the agricultural baler;

one or both of a torque or a rotational speed of a rotor of the agricultural baler;

an activation or deactivation of blades of the agricultural baler;

one or both of a rotational speed or a number of strokes of a feed rake of the agricultural baler;

a pressure to be applied in a pressing chamber of the agricultural baler;

an activation or deactivation of a binding device of the agricultural baler; or a deposit of a bale formed using the agricultural baler.

6. The agricultural machine assembly of claim 1, wherein the one or more setting parameters of the agricultural work machine and the one or more setting parameters of the agricultural baler comprise each of:

a driving speed settable using one or both of a drive unit or a drive train of the agricultural work machine;

a steering angle adjustable using a steering system of the agricultural work machine;

an orientation of the agricultural baler relative to the agricultural work machine;

a rotational speed of a power take-off shaft of the agricultural work machine;

a hydraulic pressure to be provided using a hydraulic system of the agricultural work machine;

a tire pressure of at least one ground engaging means of the agricultural work machine;

one or both of a torque or a rotational speed of a pick-up of the agricultural baler;

one or both of a torque or a rotational speed of a rotor of the agricultural baler;

an activation or deactivation of blades of the agricultural baler;

one or both of a rotational speed or a number of strokes of a feed rake of the agricultural baler;

a pressure to be applied in a pressing chamber of the agricultural baler;

an activation or deactivation of a binding device of the agricultural baler; and a deposit of a bale formed using the agricultural baler.

7. The agricultural machine assembly of claim 1, wherein the driver assistance system comprises a plurality of strategies;

wherein the at least one operating and display unit is configured to receive a selection of a respective strategy from the plurality of strategies; and wherein the driver assistance system is configured to optimize the mode of operation of the agricultural machine assembly based on the respective strategy.

8. The agricultural machine assembly of claim 7, wherein the plurality of strategies comprise one of more of: bale density strategy; bale quality strategy; energy consumption strategy; throughput strategy; binding material strategy; service life strategy; or user-defined strategy.

9. The agricultural machine assembly of claim 7, wherein the plurality of strategies comprise: bale density strategy; bale quality strategy; energy consumption strategy; throughput strategy; binding material strategy; service life strategy; and user-defined strategy.

10. The agricultural machine assembly of claim 1, wherein the driver assistance system is further configured to perform a dialog for input by an operator of the agricultural machine assembly;

wherein the driver assistance system is configured to determine the one or more setting parameters of the agricultural work machine and the one or more setting parameters of the agricultural baler for optimizing the mode of operation of the agricultural machine assembly based on the dialog; and wherein the driver assistance system is configured to perform the determination of at least some of the one or more setting parameters by the driver assistance system before one or both of starting up the agricultural machine assembly or assumption of a baling process by the agricultural machine assembly.

11. The agricultural machine assembly of claim 10, wherein the driver assistance system is configured, using a settings module, to perform one or more of:

dialog-based retrieval;

dialog-based input; or a dialog-based specification of one or both of operating parameters or machine parameters of the agricultural work machine and the agricultural baler.

12. The agricultural machine assembly of claim 10, wherein the driver assistance system is configured, using a settings module, to perform:

dialog-based retrieval;

dialog-based input; and a dialog-based specification of one or both of operating parameters or machine parameters of the agricultural work machine and the agricultural baler.

13. The agricultural machine assembly of claim 1, wherein the functional model comprises at least one n-dimensional characteristic map which is assigned to at least one setting parameter of one or both of the agricultural work machine or the agricultural baler in order to map the one or more functional relationships of the agricultural work machine and the agricultural baler adapted thereto;

wherein the at least one setting parameter is defined as an output variable of the at least one n-dimensional characteristic map; and wherein the at least one n-dimensional characteristic map is configured to receive as input information generated by machine-internal sensor systems; external information; information from at least one computing unit, and the information received via the at least one operating and display unit.

14. The agricultural machine assembly of claim 1, wherein the functional model comprises at least one n-dimensional characteristic map which is assigned to at least one setting parameter of both of the agricultural work machine and the agricultural baler in order to map the one or more functional relationships of the agricultural work machine and the agricultural baler adapted thereto; and wherein the at least one setting parameter is defined as an output variable of the at least one n-dimensional characteristic map.

15. The agricultural machine assembly of claim 1, wherein the driver assistance system is configured to generate an output, using the at least one operating and display unit, of an operating process for adjusting a setting parameter to be adapted for optimizing the mode of operation of the agricultural machine assembly.

16. The agricultural machine assembly of claim 1, wherein the automatic work machine setting device and the baler setting device are functionally separate devices.

17. The agricultural machine assembly of claim 16, wherein the automatic work machine setting device and the baler setting device form a common setting device.

18. The agricultural machine assembly of claim 17, wherein the automated work machine setting device and the baler setting device, respectively, bring about an automatic optimization of the mode of operation of the agricultural work machine and the agricultural baler as a function of one another using the functional model of the agricultural work machine and the agricultural baler.

19. The agricultural machine assembly of claim 18, wherein the automatic work machine setting device and the baler setting device form the common setting device in separate computer threads within a single computing device or in separate computing devices.

20. The agricultural machine assembly of claim 18, wherein the at least one control apparatus comprises a first control apparatus resident on the agricultural work machine and configured to control the agricultural work machine and a second control apparatus resident on the agricultural baler and configured to control the agricultural baler; and wherein the driver assistance system is configured to:

control actuation of the one or more working units of the agricultural work machine based on the one or more setting parameters of the agricultural work machine by transmitting agricultural work machine commands to the first control apparatus resident on the agricultural work machine; and control actuation the one or more working units of the agricultural baler based on the one or more setting parameters of the agricultural baler by transmitting agricultural baler commands to the second control apparatus resident on the agricultural baler.

* * * * *